United States Patent [19]
Withey

[11] Patent Number: 5,938,562
[45] Date of Patent: Aug. 17, 1999

[54] BRAKE SHIFTER INTERLOCK WITH IMPROVED PARK LOCK SWITCH

[75] Inventor: Charles D. Withey, Waterford, Mich.

[73] Assignee: Pontiac Coil, Inc., Clarkston, Mich.

[21] Appl. No.: 09/024,709

[22] Filed: Feb. 17, 1998

[51] Int. Cl.$^6$ ................................................ B60K 41/20
[52] U.S. Cl. ................... 477/96; 192/220.3; 192/220.4; 200/284
[58] Field of Search ................... 192/220.3, 222, 192/4 A, 220.4; 200/284; 439/9; 477/96

[56] References Cited

U.S. PATENT DOCUMENTS

| | | | |
|---|---|---|---|
| 3,030,479 | 4/1962 | Erlich et al. | 200/284 |
| 3,085,139 | 4/1963 | Wright | 200/284 |
| 3,945,808 | 3/1976 | Sheesley | 200/5 R X |
| 4,473,141 | 9/1984 | Mochida . | |
| 4,474,085 | 10/1984 | DeVogelaere et al. . | |
| 4,854,193 | 8/1989 | Newman et al. . | |
| 4,887,702 | 12/1989 | Ratke et al. . | |
| 4,947,967 | 8/1990 | Kito et al. . | |
| 4,986,399 | 1/1991 | Gokee . | |
| 5,009,295 | 4/1991 | Kinkade et al. . | |
| 5,018,610 | 5/1991 | Rolinski et al. . | |
| 5,027,929 | 7/1991 | Ratke et al. . | |
| 5,076,114 | 12/1991 | Moody . | |
| 5,078,242 | 1/1992 | Ratke et al. . | |
| 5,096,033 | 3/1992 | Osborn . | |
| 5,167,308 | 12/1992 | Osborn . | |
| 5,176,231 | 1/1993 | Moody et al. . | |
| 5,251,723 | 10/1993 | Rolinski et al. | 192/220.4 X |
| 5,402,870 | 4/1995 | Osborn | 192/220.7 |
| 5,489,246 | 2/1996 | Moody et al. . | |
| 5,494,141 | 2/1996 | Osborn | 192/220.4 |
| 5,647,818 | 7/1997 | Moody . | |
| 5,718,312 | 2/1998 | Osborn | 192/220.4 |

FOREIGN PATENT DOCUMENTS 459485  12/1991  European Pat. Off. ............... 192/4 A

*Primary Examiner*—Charles A Marmor
*Assistant Examiner*—Ha Ho
*Attorney, Agent, or Firm*—Young & Basile, P.C.

[57] ABSTRACT

A control device for a brake/transmission/ignition interlock for a motor vehicle. The control device includes an electromagnetic device conditioned in response to application of the brake, a release mechanism operative in response to the condition of the electromagnetic device to allow movement of the shift lever out of the park position to an operating position, and a control switch operative in response to movement of the shift lever out of the park position to place the ignition switch in the lock condition. The control device includes a lead frame formed of a flat conductive metal stock and stamped and configured to define the control switch and a plurality of leads. The control switch has a first position in which the leads coact to establish a circuit to the electromagnetic device and a second position in which the circuit to the electromagnetic device is interrupted and the leads coact to establish a circuit to the ignition switch to place the ignition switch in its locked condition and thereby preclude removal of the ignition key. The switch is moveable between its first and second positions in response to movement of the shift lever out of the park position.

2 Claims, 4 Drawing Sheets

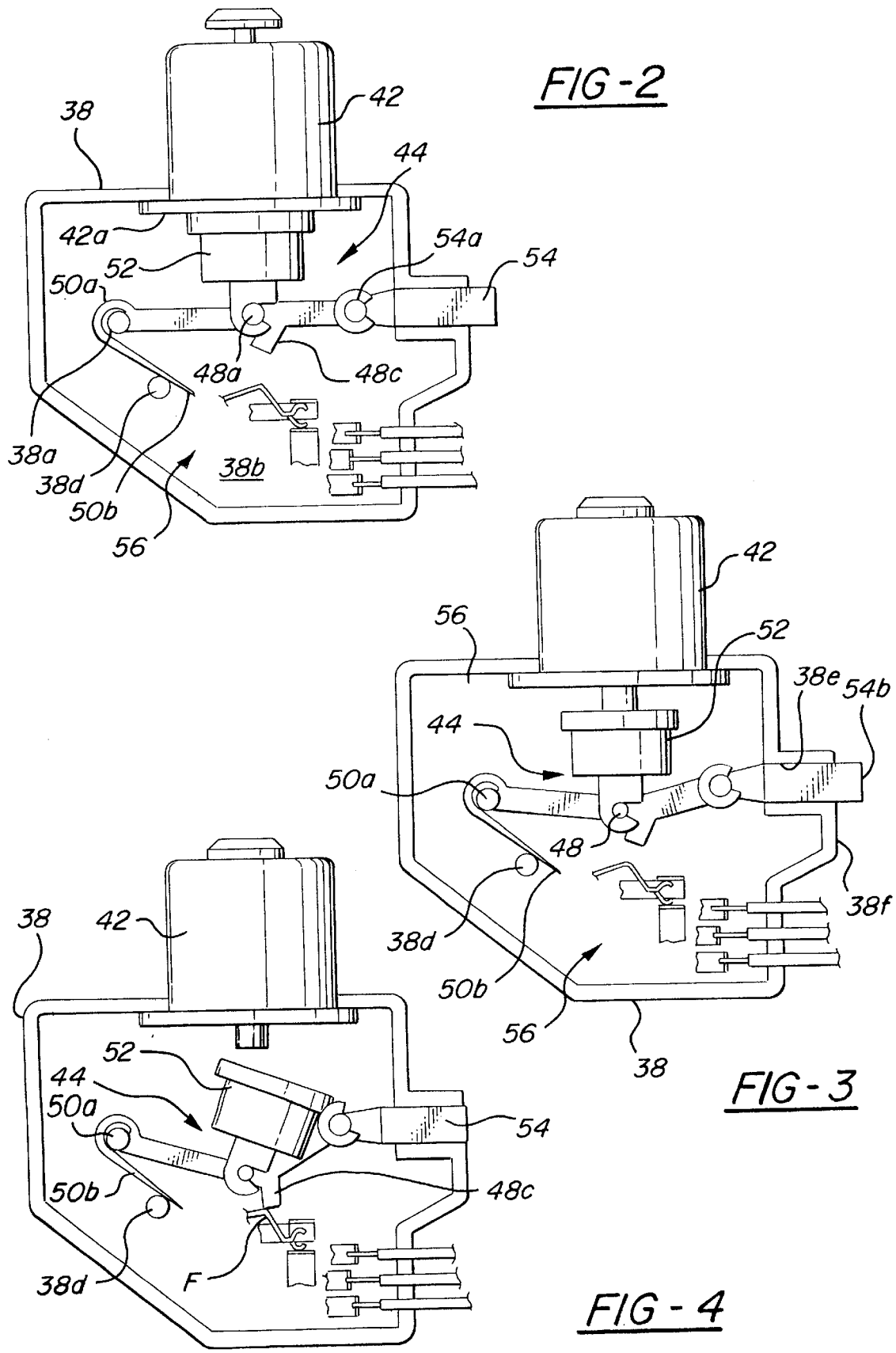

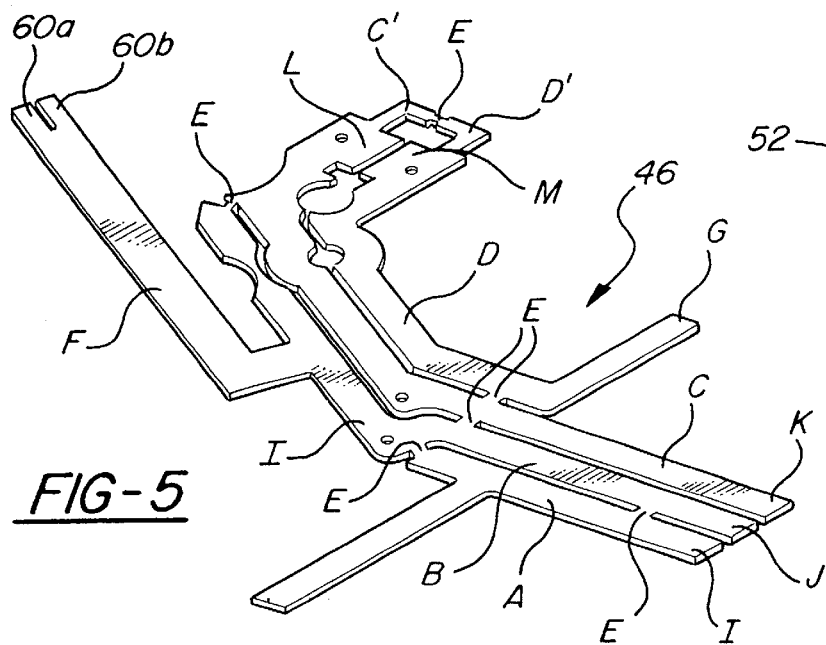
FIG-5
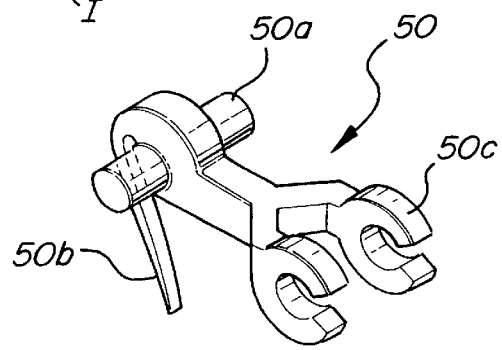
FIG-8
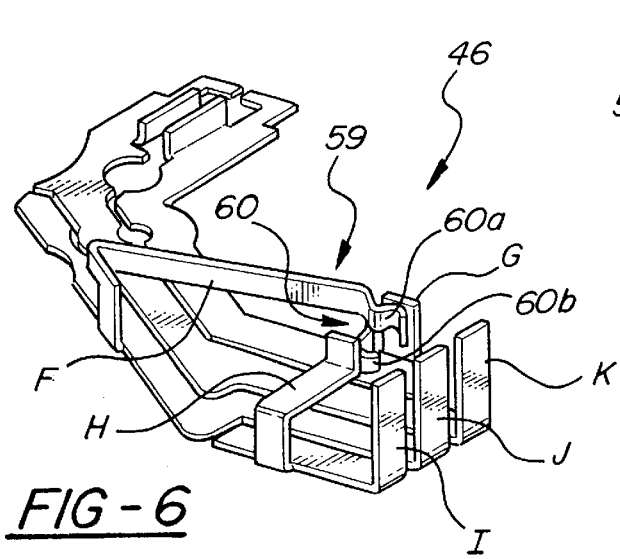
FIG-6
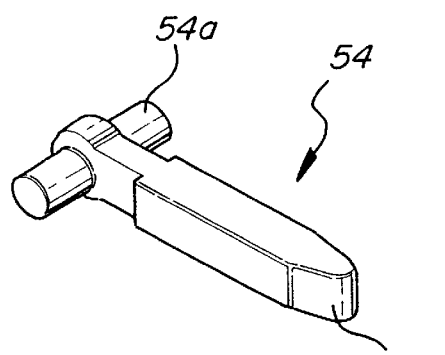
FIG-9
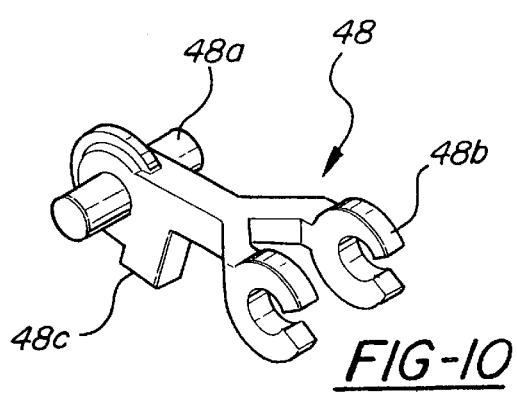
FIG-10
FIG-11

BRAKE SHIFTER INTERLOCK WITH IMPROVED PARK LOCK SWITCH

FIELD OF THE INVENTION

This invention relates to brake shift interlocks for motor vehicles and more particularly to a motor vehicle brake shift interlock which further includes an ignition switch interlock.

BACKGROUND OF THE INVENTION

A typical brake transmission safety interlock (BTSI) operates to prevent a vehicle's transmission from being taken out of the park position if the service brake is not applied. The typical BTSI system includes an electromagnetic device positioned in the brake light circuit of the vehicle which is operable to immobilize the shifter linkage and inhibit movement of the linkage out of the park position unless and until the service brake is applied. BTSI systems also may further include an ignition switch interlock whereby the ignition key may not be removed from the ignition switch when the vehicle is out of park. Various systems have been proposed and utilized to achieve a combined brake interlock and ignition switch interlock function but these prior art systems have been complicated and expensive in construction. They have also been unreliable, thereby creating maintenance problems, have been difficult to install, and have tended to be noisy in operation.

SUMMARY OF THE INVENTION

This invention is directed to the provision of an improved BTSI system.

More specifically, this invention is directed to the provision of a BTSI system which provides both a brake switch interlock and an ignition switch interlock in a simple, cost effective manner.

Yet more specifically, this invention is directed to the provision of combined ignition switch interlock and brake switch interlock which is simple in construction, reliable in operation, and quiet.

The invention provides an interlock control device for use with a motor vehicle of the type including an ignition switch having a lock condition in which the ignition key cannot be removed from the ignition switch, a brake, a transmission, and a shift lever for shifting the transmission and including a park position. The control device includes an electromagnetic device conditioned in response to application of the brake, release means operative in response to the condition of the electromagnetic device to allow movement of the shift lever out of the park position, and a control switch operative in response to movement of the shift lever out of the park position to place the ignition switch in the lock condition.

According to the invention, the control device includes a lead frame formed of a flat conductive metal stock and stamped and configured to define the control switch and a plurality of leads; the control switch has a first position in which the leads coact to establish a circuit to the electromagnetic device and a second position in which the circuit to the electromagnetic device is interrupted and the leads coact to establish a circuit to the ignition switch to place the ignition switch in its lock condition to preclude removal of the ignition key; and the switch is moveable between its first and second positions in response to movement of the shift lever out of the park position. This arrangement enables a simple lead frame to provide the required circuitry to the electromagnetic device and to the ignition switch and to further provide a switch to control the circuits in response to the movement of the shift lever out of the park position.

According to a further feature the invention, the control device includes a housing having a chamber defined in part by a flat wall surface and the lead frame is positioned within the chamber against the flat wall surface. This specific housing and lead frame construction provides a simple and effective system package.

According to a further feature the invention, after the lead frame is positioned in the chamber against the flat wall surface, the lead frame is selectively severed to define the plurality of leads. This sequence of operations simplifies the installation of the circuitry and the switch in the housing.

According to a further feature the invention, the control switch is defined by an arm bent upwardly from the flat stock and defining a contact selectively coacting with terminals bent upwardly from the flat stock to define the first and second switch positions. This arrangement allows the lead frame to readily define both the required leads and the switch itself.

According to further feature of the invention, the release means comprises a toggle joint positioned in the housing chamber proximate the control switch; the toggle joint is moved to an over center position in response to conditioning of the electromagnetic device; the toggle joint is moved to a further over center position in response to movement of the shift lever out of the park position; and the movement of the toggle joint to the further over center position is operative to move the control switch between its first and second positions. This specific interaction between the toggle joint and the control switch provides a simple but effective means of controlling the circuitry of the system during the movement of the shift lever out of the park position to an operating transmission range.

The invention also provides a methodology for providing a control device for allowing the movement of a motor vehicle shift lever out of a park position in response to application of the vehicle brake. According to the invention methodology, a housing having a chamber defined in part by a flat wall surface is provided; an electromagnetic device is provided proximate the housing; a plurality of electrical wires are provided extending into the chamber; a lead frame is provided formed of a flat electrically conductive metal stock; the lead frame is stamped and configured to provide a plurality of juxtaposed leads joined at connection points and a switch formed of portions of the frame bent upwardly out of the general plane of the frame; the frame is positioned in the chamber against the flat wall surface with the switch positioned in the chamber; the frame is severed at the connection points to provide a plurality of juxtaposed individual leads positioned against the flat wall surface; the individual leads are electrically connected to terminals of the electromagnetic device and to the electrical wires to form circuits controlled by movement of the switch between first and second positions; and means are provided in the chamber which are operative in response to movement of the shift lever out of the park position to move the switch between its first and second positions. This simple, direct methodology allows a simple, inexpensive lead frame to be readily configured and installed in a manner to provide the required circuitry and the required interlock function for both the brake shift interlock and the ignition switch interlock.

BRIEF DESCRIPTION OF THE DRAWINGS

FIGS. 2, 3 and 4 are cross-sectional views showing the operation of the brake shifter interlock;

FIGS. 5 and 6 are perspective views showing the formation of a lead frame for use in the brake shifter interlock;

FIGS. 8–11 are detail views of components of a toggle joint assembly employed in the invention brake shifter interlock.

DETAILED DESCRIPTION OF THE PREFERRED EMBODIMENT

Figure 1:
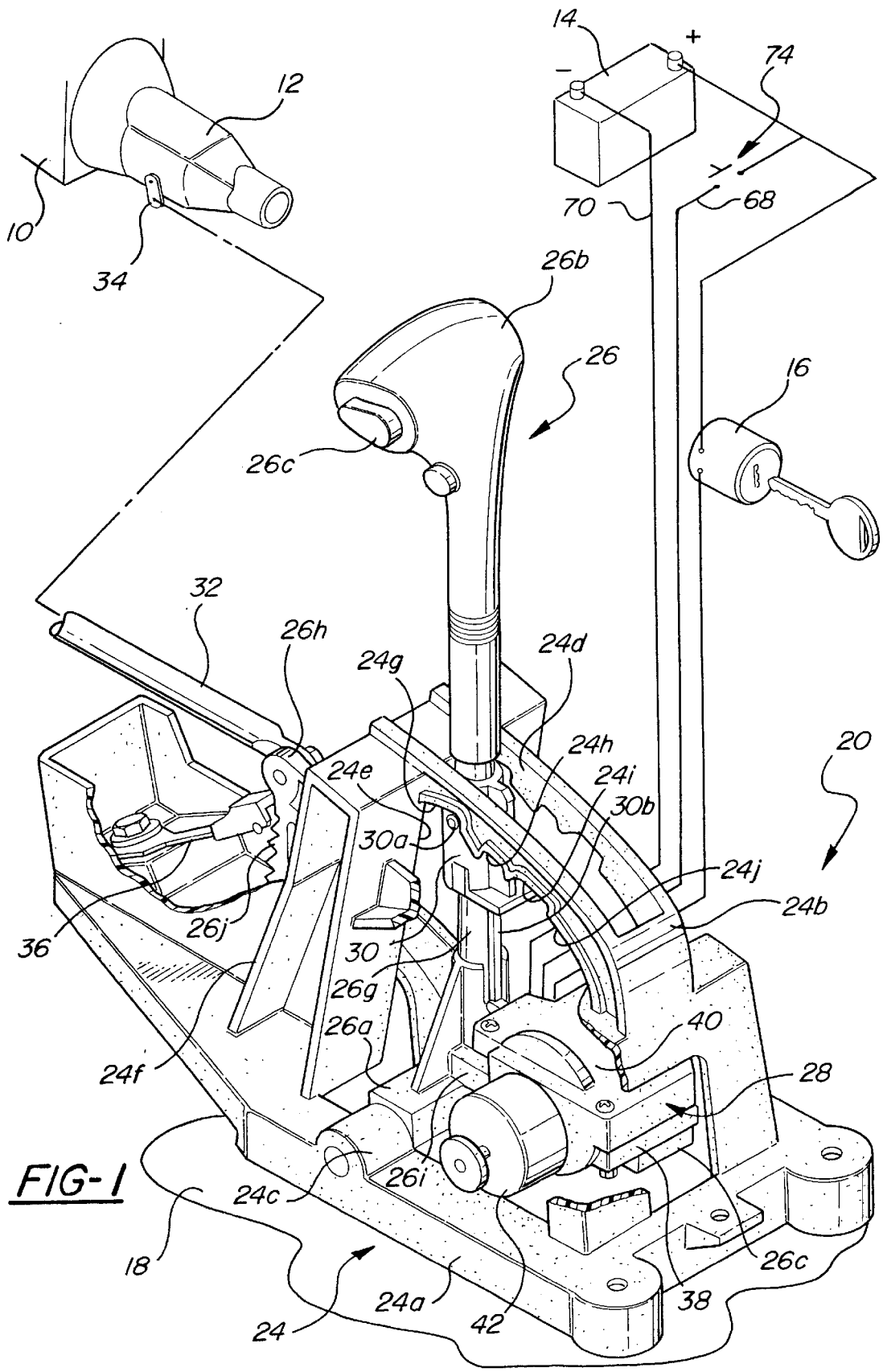
FIG. 1 is a perspective, somewhat schematic view of a brake shifter interlock system according to the invention.

The invention is seen in FIG. 1 incorporated schematically in a motor vehicle including an engine 10, an automatic transmission 12, a battery 14, an ignition switch 16, a body including a console structure 18 within the vehicle passenger compartment, and a shift lever assembly 20. It will be understood that the transmission 12 is shifted by suitable actuation of the shift lever assembly 20 with provision, according to the invention, to insure that the shifter cannot be moved out of the park position unless and until the vehicle service brake is applied and with further provision to ensure that the ignition key 22 cannot be removed from the ignition switch 16 with the vehicle in an operating mode.

Shifter lever assembly 20 includes a frame structure 24, a shift lever assembly 26, and a control device 28. Frame structure 24 may be formed, for example, of a suitable plastic material in a molding operation and includes a base portion 24a adapted to be suitably secured to body console portion 18 and a quadrant portion 24b upstanding from the base portion.

Figure 7:
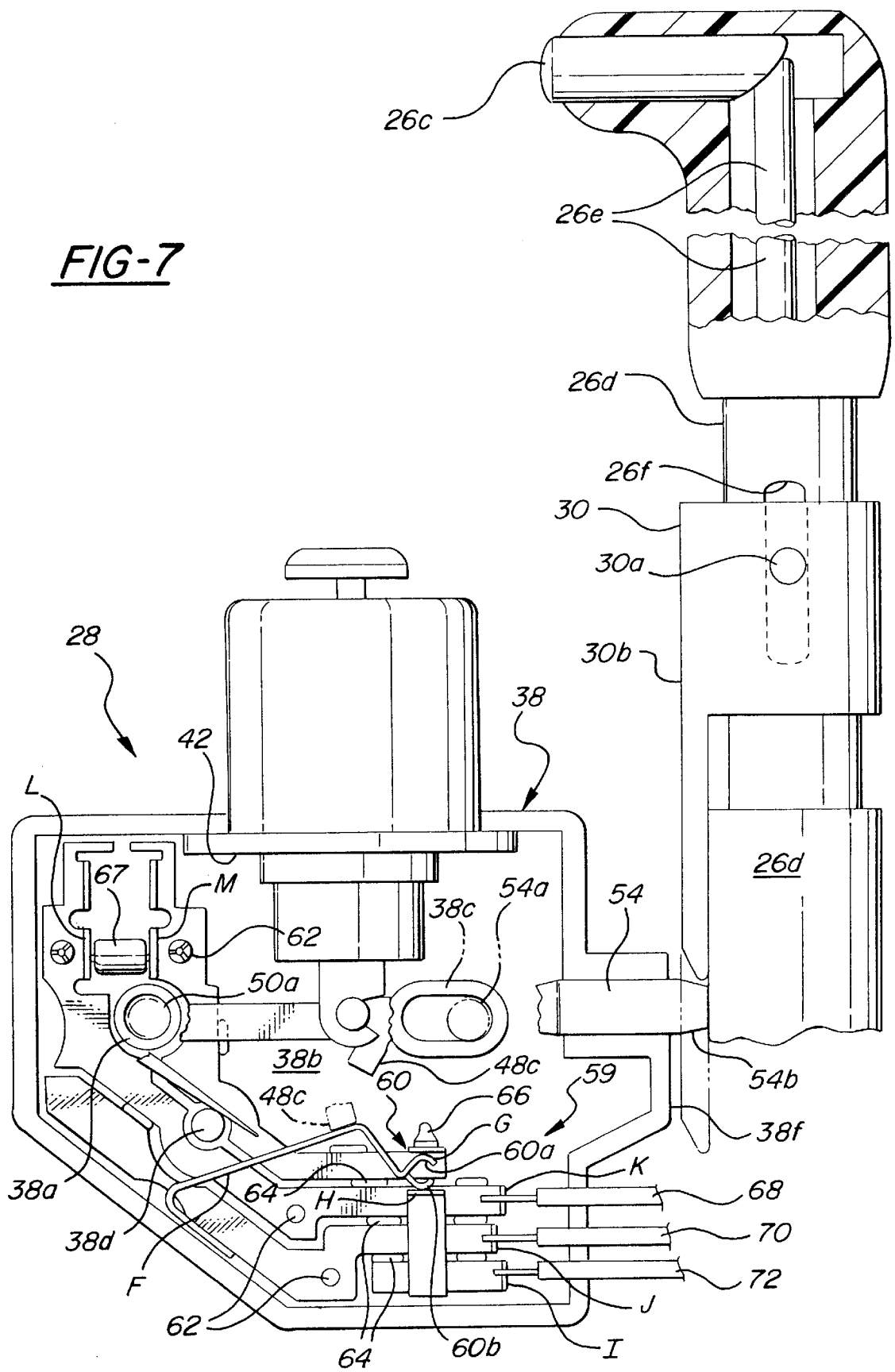
FIG. 7 is a somewhat schematic view showing the positioning of the lead frame in the housing of the brake shifter interlock.

Shift lever assembly 26 is pivotally mounted at its lower end 26a on trunions 24c defined by the frame base structure and includes a handle 26b at its upper end mounting a shift button 26c. Shift lever assembly 26 further includes a collar 30 (see also FIG. 7) slidably mounted on a central cylindrical portion 26d of the shift lever assembly and including a detent pin 30a projecting from either side of collar. It will be understood that collar 30 is moveable up and down along shaft 26d, in known manner, in response to inward movement of button 26c. For example, as best seen in FIG. 7, the inboard end of button 26c may cammingly coact with the upper end of an actuator rod 26e which extends downwardly within the shift lever for connection at its lower end to collar 30 so that inward or pushing movement on the push button 26c results in downward movement of collar 30 with detent pin 30a moving slideably in a slot 26f in central shaft portion 26d.

The lower portion 26g of the shift lever includes a forwardly extending arm 26h for attachment to a transmission control link or cable 32 connected to the mode select lever 34 of the automatic transmission and a rearwardly extending support arm 26i for mounting the control device 28. The intermediate portion of the shift lever moves in an arcuate slot 24d defined in frame quadrant portion 24b and arm 26h moves in a vertical slot 24e defined in an upright or tower portion 24f of the quadrant structure. It will be understood that the shifter assembly is moved pivotally about a lower axis defined by trunions 24c between selected transmission positions with the transmission position being defined in each case by coaction of detent pin 30a with a selected detent defined along the lower arcuate surface of the frame quadrant portion 24b. For example, detent 24g may define the park position of the transmission; detent 24h may define the reverse position; detent 24i may define the neutral position; and detent 24j may define the various drive positions. Further, in known matter, a roostercomb portion 26j of arm 26h coacts with a spring loaded detent 36 to further define the various positions of the transmission as the shift lever is moved by the operator between its various shift positions.

Control device 28 (FIGS. 1, 2, 3, 4, 7) includes a lower housing 38, an upper housing 40, an electromagnetic device 42, a release mechanism 44, and a lead frame 46.

Lower and upper housings 38, 40 may be formed of a suitable plastic and are suitably joined together to define a chamber 56.

Electromagnetic device 42 (which may comprise a solenoid, coil etc.) is positioned in an opening defined in the assembled upper and lower housings 38,40 to dispose the inner face 42a of the electromagnetic device within chamber 56.

Release mechanism 44 (see also FIGS. 8–11) comprises a first toggle joint 48; a second toggle joint 50; an insert molded permanent magnet link 52; and a block pin 54.

A permanent magnet 52b positioned flush in the outboard face of link 52 coacts with the magnetic face 42a of the electromagnetic device 42 so that, when device 42 is not energized, magnetic link 52 is magnetically held against the magnetic face 42a. A pair of arms 52a on the inboard face of link 52 coact to define a journal for pivotal receipt of a pin 48a defined on the inboard end of the first toggle joint 48. First toggle joint 48 further defines bifurcated journal arm portions at the outboard end of the arm and a switch actuator finger portion 48c proximate pin 48a.

Second toggle joint 50 defines a pin 50a proximate the outboard end of the arm, a tail spring portion 50b, and a pair of bifurcated journal arms 50c at the inboard end of the joint.

Block pin 54 includes a pin 54a at its inboard end and defines a beveled end edge 54b at its outboard end.

In the assembled relation of the release mechanism 44, pin 50a is journaled in a socket 38a extending upwardly from the lower face 38b of lower housing 38, pin 54a is slidably received in an oblong socket 38c extending upwardly from the lower face of the lower housing, journal arms 48b are pivotally received on pin 54a; pin 48a, defining the central pivot axis of the toggle joint, passes through apertures in journal arms 50c for journaling receipt in journal arms 52a; tail spring portion 50b of toggle joint 50 bears resiliently against a post 38d upstanding from the lower face of the lower housing; and block pin 54 is slideably received in a passage 38e defined in an outer wall of the housing with the outboard end of the block pin projecting outwardly beyond the outer face 38f of the outer housing wall.

Lead frame 46 (FIGS. 5, 6, 7) is formed of a flat conductive metal stock such, for example, as brass. Lead frame 46 is shown in its flat undeveloped configuration in FIG. 5, in its 3-dimensional developed configuration in FIG. 6, and in its installed configuration in FIG. 7.

In its flat, stamped, undeveloped configuration seen in FIG. 5, lead frame 46 includes parallel elongated portions A,B,C, and D; connector portions E joining the portions A,B,C, and D; and terminal portions F,G,H,I,J,K,L,M.

In the developed configuration seen in FIG. 6, terminal portions F,G,H,I,J,K,L, and M have been bent upwardly out of the general plane of the lead frame to define terminals and to define a single throw, double pole switch 59 defined by compoundly bent portion F coacting with upwardly bent contact terminal portions H and G. Specifically, bent terminal portion F extends over the main body of the lead frame to define a resilient, cantilever arm defining a contact 60 at its free end for selective coaction with terminals or poles H and G. Contact 60 may comprise a bifurcated structure including an upper arcuately bent portion 60a for coaction with terminal G and a lower oppositely bent portion 60b for coaction with terminal H.

In the assembled configuration of the lead frame, as best seen in FIG. 7, the main body of the lead frame is positioned against the flat lower face 38b of lower housing 38. Led frame 46 is maintained in its desired position within the housing chamber 56 by stakes 62 upstanding from lower face 38b for staked passage through suitable apertures in the lead frame; suitable spacing is maintained between frame portions A,B,C, and D by spacers 64 upstanding from lower face 38b and having serrated configurations coacting with matching serrations along the edges of the portions A,B,C, and D to firmly grip the portions; and terminals I,J, and K are maintained in proper upstanding position by posts 66 upstanding from wall surface 38b.

Following the positioning of the lead frame within chamber 56 against flat wall surface 38b, connections E are suitably fractured or severed so as to create individual, isolated leads A,B,C, and D; the free ends D' and C' of leads C and D are respectively electrically connected to the opposite ends of the coil of electromagnetic device 42; if desired, a suitable circuit element 67 is electrically connected between upstanding terminals L and M; and electrical wires or leads 68, 70 and 72, which pass through suitable apertures in the assembled upper and lower housings, are electrically connected to terminals I, J and K respectively.

The parameters of the lead frame are selected such that in the absence of external disturbing forces, switch 60 is maintained in a position in which contact 60a bears against terminal or pole G and contact 60b is spaced from terminal or pole H.

The assembled control device 48 is supported on and attached to shift lever support arm 26i with the outboard end 54b of block pin 54 projecting into the path of downward movement of a finger portion 30b of collar 30 of the shift lever. Note that in FIG. 7, for purposes of illustration, shift lever assembly 26 has been rotated 90 degrees from its actual disposition relative to control device 28.

Operation

In the operation of the motor vehicle, the desired operational mode of the transmission 12 is selected by suitable pivotal movement of shift lever 26 within frame quadrant 20 with detent pin 38a coacting in each case with a suitable detent in the frame quadrant to define the desired transmission position. In accordance with standard safety practice, the transmission may not be moved out of the park position without depressing the actuator button 26c and, even then, the transmission may not be moved out of the park position unless and until the service brake is applied to actuate a suitable switch 74 associated with the brake light circuit of the vehicle.

Specifically, inward movement of button 26c to move detent pin 30a downwardly to enable the transmission to be moved out of the park position is precluded by engagement of the finger portion 30b of collar 30 with the projecting tip 54b of block pin 54, and inward movement of block pin 54 such as would allow downward movement of finger 30b is precluded by toggle joints 48 and 50 which are maintained in an essentially straight line configuration by the magnetic attraction between the permanent magnet 52b of magnetic link 52 and the magnetic face 42a of electromagnetic device 42. That is, in so long as magnetic link 52 is held against electromagnetic device face 42a, inward, releasing movement of block pin 54 is prevented and the transmission cannot be moved out of park unless and until switch 74 is actuated. Upon closing of switch 74 upon application of the vehicle service brake, a circuit is completed to the opposite ends of the coil of the electromagnetic device 42 to energize the electromagnetic device.

Specifically, a circuit is established through switch 74, wire 68, and lead C to one terminal of the electromagnetic device and a circuit is established to the other terminal of the electromagnetic device via wire 70, terminal F, switch contact 60a, terminal G and lead D. Once the electromagnetic device has been energized, magnetic link 52 is magnetically repelled from face 42a to move the central toggle pin 48a from a position in straight line relation with pin 50a and pin 54a (as seen in FIG. 2) to a position (FIG. 3) wherein pin 48a has moved out of alignment with pins 50a and 54a.

At this time, downward pressure exerted on finger 30b via inward pushing movement on button 26c is effective to push block pin 54 inwardly to a position flush with housing face 38f and allow the finger 30b and thereby detent 30a to move downwardly to a position clear of quadrant detent 24g to allow the shift lever to be moved out of park to a desired operative quadrant position. As block pin 54 is moved inwardly by finger 30b, toggle linkage 48,50 moves to a further over center position (FIG. 4) wherein toggle finger portion 48c engages lead frame cantilever portion F and moves contact 60a away from terminal G and moves contact 60b into contact with terminal H.

This has the effect of breaking the circuit to the electromagnetic device and making a circuit to ignition switch 16 via wire 72, terminal H, terminal F, lead B and wire 70. This tells the ignition switch 16 that the vehicle transmission is now being moved to an operating mode whereupon the ignition switch functions in known manner to condition itself to preclude removal of ignition key 22. The ignition switch remains in this key lock condition until the transmission is again returned to park, since the quadrant 24b is configured in such a way that the finger 30b of collar 30 is unable to return to a position clearing the projecting tip of block pin 54 unless and until the transmission is returned to park whereupon, as previously described, the toggle link is free to return to a straight line configuration under the urging of magnetic attraction between electromagnetic device face 42a and the permanent magnet of magnet link 52. Upon movement of the toggle mechanism back to its straight line, locked configuration, cantilever terminal F is free to move the contact 60 back to a position wherein contact is broken between terminal H and contact 60b so that, with the transmission now in neutral, the operator may remove the ignition key from the ignition switch.

The invention will be seen to provide an improved brake/transmission/ignition interlock system. More particularly, the invention will be seen to provide a brake/transmission/ignition interlock system that is simple and inexpensive in design and construction and quiet and reliable in operation. The invention will be further seen to provide an improved methodology for providing a brake/transmission/ignition interlock system.

Whereas a preferred embodiment of the invention has been illustrated and described in detail it will be apparent that various changes may be made in disclosed embodiment without departing from the scope or spirit of the invention. For example, although the control device 28 has been illustrated as a separate module attached to the shift lever, it will be apparent that the control device may be incorporated as an integral part of the shift lever. Further, the illustrated vehicle ignition circuitry will be understood to be greatly simplified and only for purposes of schematically illustrating the desired interlock relationship between the shift lever, brake, and ignition switch.

I claim:

1. A method of providing a control device for allowing the movement of a motor vehicle shift lever out of a park position in response to application of the vehicle brake, the method comprising provuding a housing having a chamber defined in part by a flat wall surface;

providing an electromagnetic device proximate the housing;

providing a plurality of electrical wires extending into the chamber;

providing a lead frame formed of a flat electrically conductive metal stock;

stamping and configuring the lead frame to provide a plurality of juxtaposed leads joined at connection points and a control switch formed of portions of the frame bent upwardly out of the general plane of the frame;

positioning the frame in the chamber against the flat wall surface with the control switch positioned in the chamber;

severing the frame at the connection points to provide a plurality of juxtaposed individual leads positioned against the flat wall surface;

electrically connecting individual leads to terminals of the electromagnetic device and to the electrical wires to form circuits controlled by movement of the control switch between first and second positions; and providing means in the chamber operative in response to movement of the shift lever out of the park position to move the control switch between its first and second positions.

2. The method according to claim 1 further comprising:

providing an ignition switch having a lock condition in which an ignition key cannot be removed from the ignition switch;

configuring the circuits controlled by movement of the control switch such that the control switch in its first position is operative to energize the electromagnetic device and the control switch in its second position is operative to place the ignition switch in its lock condition.

* * * * *